United States Patent
Mazzilli

(10) Patent No.: US 9,187,224 B1
(45) Date of Patent: Nov. 17, 2015

(54) MAGNETICALLY HELD SPOON OR SCOOPER ON A LID OF A CONTAINER AND METHOD

(71) Applicant: Joseph C Mazzilli, Bayside, NY (US)

(72) Inventor: Joseph C Mazzilli, Bayside, NY (US)

(*) Notice: Subject to any disclaimer, the term of this patent is extended or adjusted under 35 U.S.C. 154(b) by 43 days.

(21) Appl. No.: 14/296,789

(22) Filed: Jun. 5, 2014

Related U.S. Application Data

(63) Continuation-in-part of application No. 13/687,184, filed on Nov. 28, 2012, now abandoned.

(51) Int. Cl.
| | |
|---|---|
| *B65D 51/24* | (2006.01) |
| *B65D 55/00* | (2006.01) |
| *B65D 83/00* | (2006.01) |
| *A47J 45/07* | (2006.01) |

(52) U.S. Cl.
CPC .............. *B65D 55/00* (2013.01); *A47J 45/074* (2013.01); *B65D 51/242* (2013.01); *B65D 83/00* (2013.01); *B65D 51/246* (2013.01); *B65D 2313/04* (2013.01)

(58) Field of Classification Search
CPC ........ A47G 21/04; A47J 45/074; A47J 45/10; A61B 2017/00876; B65D 2313/04; B65D 2590/664; B65D 41/04; B65D 51/242; B65D 51/246; B65D 55/00; B65D 77/20
USPC ........... 220/752–776, 230, 694; 206/350, 818
See application file for complete search history.

(56) References Cited

U.S. PATENT DOCUMENTS

| | | | |
|---|---|---|---|
| 2,731,663 A | 1/1956 | Thompson | |
| 2,738,900 A | 3/1956 | Wenger | |
| 4,226,456 A | 10/1980 | Barnett | |
| 5,706,974 A | 1/1998 | Murdick | |
| 5,775,531 A | 7/1998 | Lowry | |
| 7,043,844 B2 | 5/2006 | Lin | |
| 7,464,475 B2 | 12/2008 | Tsao | |
| 8,042,704 B2 | 10/2011 | Borowski et al. | |
| D661,588 S | 6/2012 | Irani et al. | |
| 8,556,095 B1* | 10/2013 | Yamaguchi | B65D 81/366 215/228 |
| 2007/0241106 A1* | 10/2007 | Deg | A47K 1/14 220/230 |
| 2008/0156808 A1 | 7/2008 | Perry et al. | |
| 2011/0186570 A1 | 8/2011 | Perry et al. | |
| 2011/0259889 A1 | 10/2011 | Yang et al. | |
| 2012/0205376 A1 | 8/2012 | Yang et al. | |
| 2014/0061199 A1* | 3/2014 | Dalbec | B65D 51/24 220/483 |
| 2015/0173413 A1* | 6/2015 | Wells | A23P 1/084 426/302 |

\* cited by examiner

*Primary Examiner* — Anthony Stashick
*Assistant Examiner* — Mollie Llewellyn
(74) *Attorney, Agent, or Firm* — Richard B. Klar, Esq.; Law Office Richard B. Klar

(57) ABSTRACT

The present invention relates to a method and an apparatus employing at least two magnets one on a top surface of a lid and one on the bottom surface of the lid to secure the magnet on the bottom surface of the lid to the bottom surface of the lid and to provide magnetic fastening means for the measuring spoon or scooper inside the container. This facilitates the ability to store and acquire the scooper from inside the container without the need for reaching into and touching the contents of the container thus avoiding making physical contact with the contents. An additional feature is securing a handle to forming a handle with the magnet located on the top, outside surface of the lid so that the handle can be centrally located on the lid.

9 Claims, 3 Drawing Sheets

MAGNETICALLY HELD SPOON OR SCOOPER ON A LID OF A CONTAINER AND METHOD

RELATED APPLICATIONS

This is a continuation in part application of parent application Ser. No. 13/687,184 filed on Nov. 28, 2012 and claims priority thereof pursuant to 35 USC 120.

BACKGROUND

1. Field

The present invention relates to a measuring spoon or scooper secured or held on a lid of a container a method for the same. In particular, the present invention relates to a magnetically held measuring spoon or scooper on a lid of a container.

2. the Related Art

U.S. Pat. No. 2,738,900 to Wegner discloses a canister for food with a scooper and a spring is provided and affixed to the inner side of the lid to secure the scooper. U.S. Pat. No. 7,043,844 to Lin relates to a magnetic attractable spoon having a tie ring that has a hole. A spoon is combined to the hole of the tie ring; and at least one magnet installed to the tie ring for attracting metal objects. The tie ring is elastic. The tie ring has at least one embedding groove for embedding the magnet. The magnet is enclosed within the tie ring. A plurality of magnets is annularly arranged along an edge of the tie ring. The tie ring is combined to an annular body of the tie ring and the tie ring has an annular attracting surface. The hole of the tie ring is not a penetrating hole. The tie ring has a plane attracting surface or a cambered attracting surface.

SUMMARY

The present invention provides for a magnetically held measuring spoon or scooper on a lid of a container and a method for the same. The lid is preferably a non magnetic lid made of plastic or other non metallic material. The present invention provides for a method and an apparatus employing at least two magnets one on a top surface of a lid and one on the bottom surface of the lid to secure the magnet on the bottom surface of the lid to the bottom surface of the lid and to provide magnetic fastening means for the measuring spoon or scooper inside the container due to the magnetic attraction between the two magnets on both sides of the lid. This facilitates the ability to store and acquire the scooper from inside the container without the need for reaching into and touching the contents of the container thus avoiding making physical contact with the contents. An additional feature is securing a handle to form a handle with the magnet located on the top, outside surface of the lid so that the handle can be centrally located on the lid.

DETAILED DESCRIPTION OF THE PREFERRED EMBODIMENTS

Figure 1:
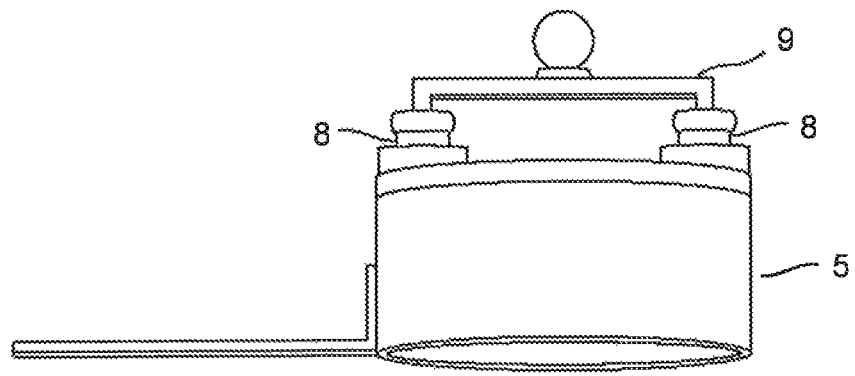
FIG. 1 illustrates an embodiment of the present invention that shows the scooper magnetically attached to the bottom magnet which in turn is magnetically attached to the top magnet that is formed as a handle is fully assembled.
Figure 2:
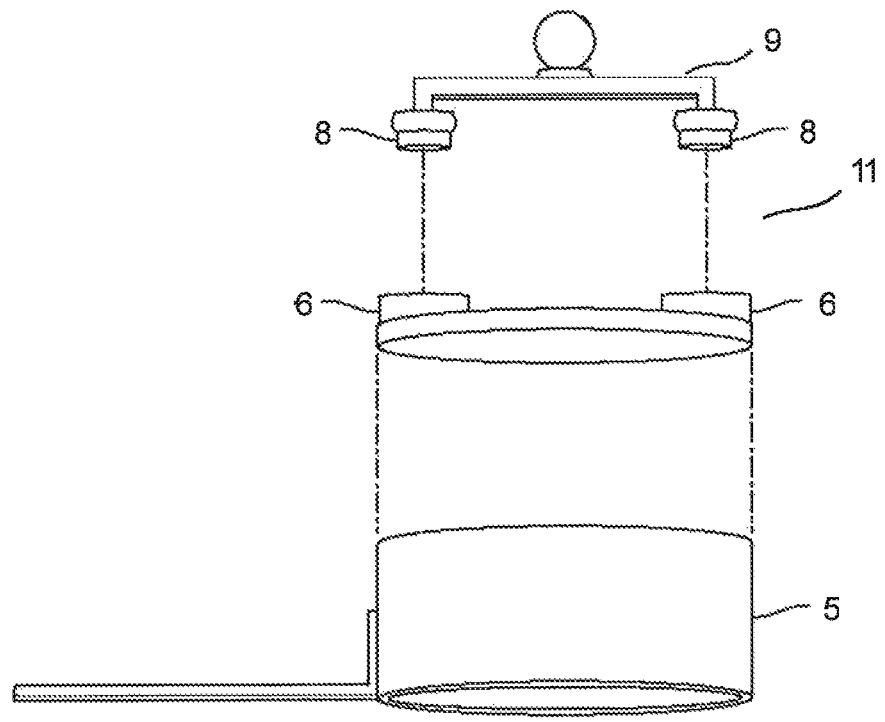
FIG. 2 shows an exploded partial view of the embodiment of FIG. 1 of the present invention without the lid.
Figure 3:
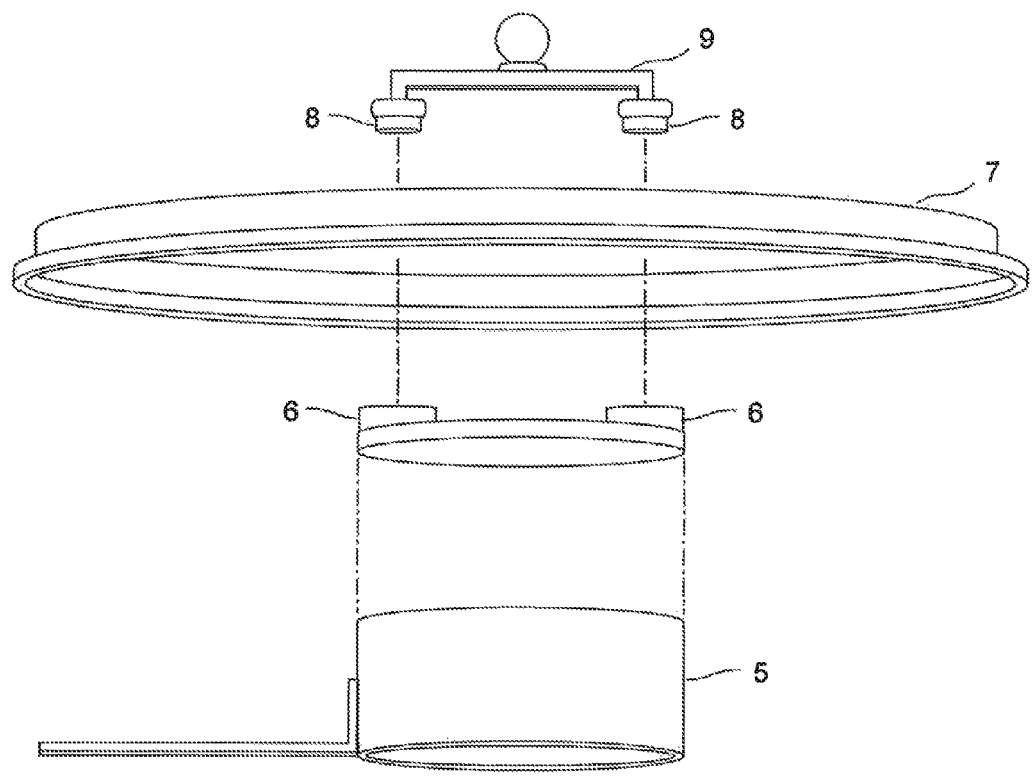
FIG. 3 shows an exploded full view of the embodiment of FIG. 1 of the present invention with the lid in place.
Figure 4:
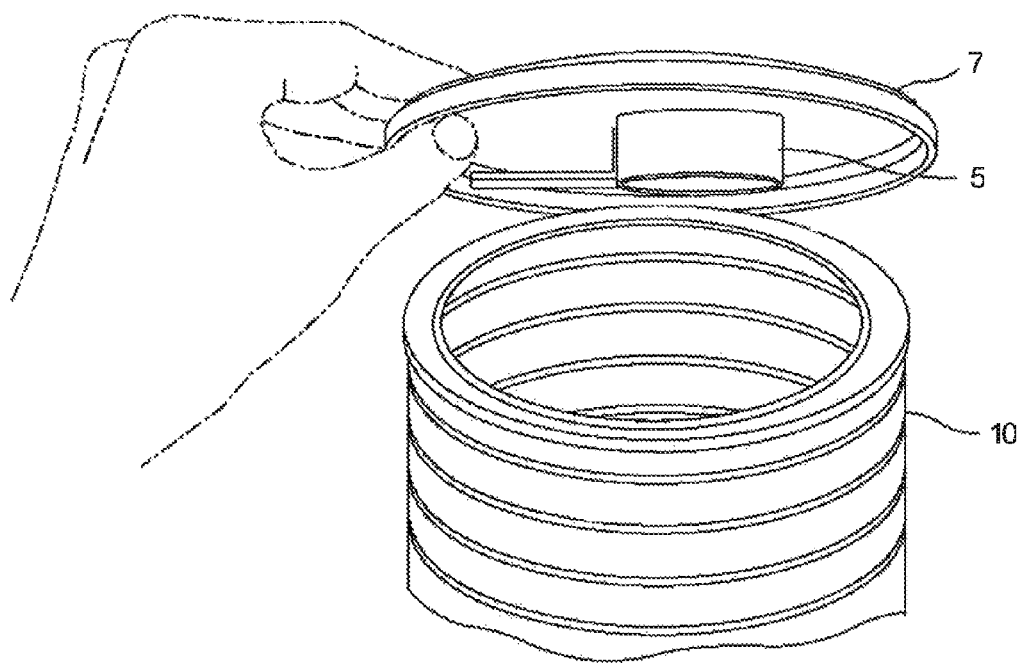
FIG. 4 shows an embodiment of the present invention with the container.

Referring now to FIGS. 1-3 of the drawings, FIG. 1 illustrates a sectional view of an embodiment of the present invention showing a scooper magnetically attached to a bottom magnet or magnets which in turn is magnetically attached to the top magnet or magnets that is formed as a handle. The top and bottom magnets together form a magnetic holding mechanism regardless of the material from which the lid is made. The lid is preferably a non magnetic lid made of plastic or other non metallic material. FIG. 2 is partially exploded view, without the lid of the container, showing the handle and top magnet or magnets that will be located above the lid. As can be seen the magnets on both ends of this embodiment are aligned on top and bottom. As shown in FIG. 3 a lid can be placed between the top magnet(s)/handle structure and the bottom magnet(s) are magnetically attached to the lid and magnetically hold the scooper as shown in FIGS. 3 and 4. The scooper can be placed and held under the lower magnetic portion of the magnetic device.

The magnets used are preferably neodymium magnets as this would be magnetically powerful enough to hold the magnets together on opposite sides of the lid on the container and also magnetically secure the scooper or spoon to the magnet or magnets on the underside of the lid. These magnets preferably are but are not limited to the following design criteria:

Dimensions: ¼" dia.×⅛" thick; Tolerances: 0.004"–0.004"; Material: NdFeB, Grade N42

Plating/Coating: Ni—Cu—Ni (nickel); Magnetization Direction: Axial (Poles on Flat Ends); Weight: 0.0266 oz. (0.754 g); Pull Force, Case 1: 2.30 lbs; Pull Force, Case 2: 3.71 lbs; Surface Field: 4667 Gauss; Max Operating Temp: 176 F (80 C); Brmax: 13,200 Gauss; BHmax: 42 MGOe The size of the scooper can vary in size from a 1 tsp (teaspoon) size to possibly 1⅔ cup size so that the present invention can be used for small container's products such as but not limited to coffee and different powder containers e.g. ice tea, KOOL-AID®, etc. and for large containers which can be mixed quite large and require a larger scooper or spoon.

The magnet or magnets on the top side of the lid could be interchangeable. For example, one could be shaped like a barbell for protein shake mixes and other shapes for coffee containers, etc. (see FIG. 4). These top magnets can be decorative.

What is claimed:

1. In combination, a lid of a container, a spoon or a scooper and at least two magnets for magnetically securing a spoon or a scooper to a lid of a container, comprising:

said lid of said container being non-magnetic and adapted to cover and to fit over and seal a top surface of said container;

at least one of said at least two magnetics located on a top surface of said lid and located outside said container when said lid is affixed to said container; said at least one magnet being formed as a handle for said lid; and at least another one of said at least two magnets located on a bottom surface of said lid and located inside of said container when said lid is affixed to said container; said at least two magnets being neodymium magnets that are magnetically strong enough to hold together on opposite sides of said non-magnetic lid and strong enough to magnetically secure said spoon or scooper to an underside of said lid, said magnets on said top surface and said bottom surface of said lid being aligned with each other.

2. The combination according to claim 1 wherein said at least one magnet of said at least two magnets located on said top surface of said lid is one magnet.

3. The combination according to claim 1 wherein said at least another magnet of said at least two magnets located on said bottom surface of said lid is one magnet.

4. The combination according to claim 1, wherein said at least one magnet of said at least two magnets located on and said top surface of said lid is two magnets.

5. The combination according to claim 1, wherein said at least another magnet of said at least two magnets located on said bottom surface of said lid is two magnets.

6. The combination according to claim 1 wherein said at least one magnet of said at least two magnets located on said top surface is located centrally on said top surface of said lid.

7. The combination according of claim 1, wherein said one of said at least two magnets located on said top surface of said lid is shaped to represent a symbol for a content of said container.

8. The combination according to claim 1 wherein said handle is formed as a barbell when a content of said container is a protein shake mix.

9. A method for securing a spoon or a scooper to a lid of a container, the steps comprising:
   positioning at least one magnet on a top surface of a non-magnet lid of a container, said lid is adapted to fit and seal a top surface of the container, said at least one magnet is located outside of said container when said lid is affixed to said container, said at least one magnet being formed as a handle for said lid;
   positioning at least another magnet on a bottom surface of said lid, at least another magnet is located inside of said container when said lid is affixed to said container, said magnets are aligned to secure said magnets in position;
   magnetically securing a scooper or a spoon to said at least another magnet secured to said bottom surface of said lid so as to removably magnetically affix said scooper or spoon just below an inside surface of said lid when said lid is affixed to said container, said two magnets being neodymium magnets that are magnetically strong enough to hold together on opposite sides of said non-magnetic lid.

\* \* \* \* \*